UNITED STATES PATENT OFFICE.

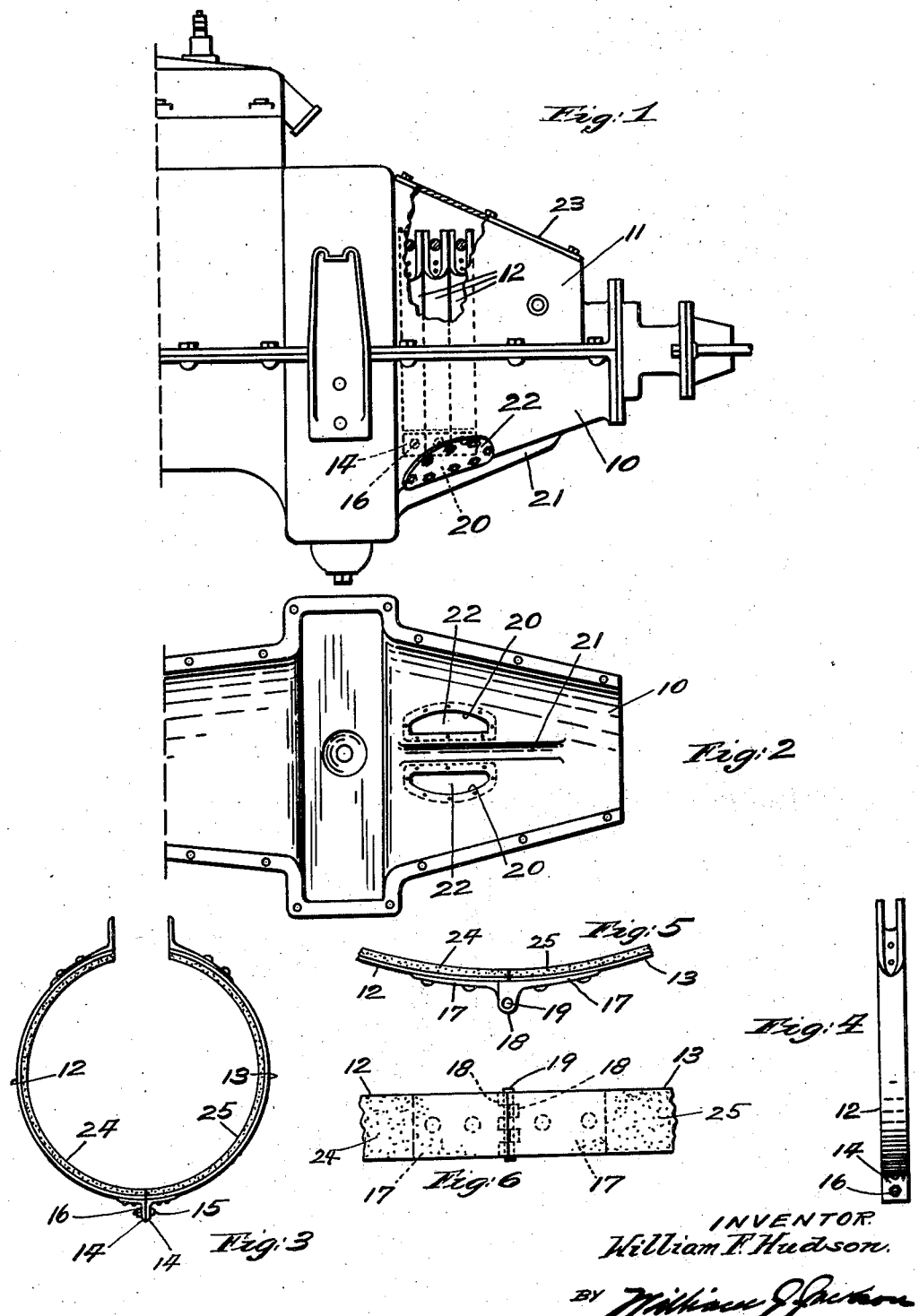

WILLIAM F. HUDSON, OF PHILADELPHIA, PENNSYLVANIA, ASSIGNOR TO HUDSON MOTOR SPECIALTIES COMPANY, OF PHILADELPHIA, PENNSYLVANIA, A CORPORATION OF PENNSYLVANIA.

CLUTCH-BAND AND CASING THEREFOR.

1,398,191. Specification of Letters Patent. Patented Nov. 22, 1921.

Application filed March 16, 1921. Serial No. 452,844.

*To all whom it may concern:*

Be it known that I, WILLIAM F. HUDSON, a citizen of the United States, residing at the city of Philadelphia, county of Philadelphia, and State of Pennsylvania, have invented certain new and useful Improvements in Clutch-Bands and Casings Therefor, of which the following is a specification.

This invention, generally stated, relates to clutch bands including casings therefor and has more especial relation to clutch bands as employed in connection with planetary transmission power plants.

The leading object of the present invention is to provide a clutch band capable of ready separation in at least two sections and in the provision of a casing therefor equipped with covered openings which openings are positioned in juxtaposition to the separable portions of a clutch band. Other and further objects will appear in the following description.

The invention consists of the improvements hereinafter described and finally claimed.

The nature, characteristic features and scope of the invention will be more fully understood from the following description taken in connection with the accompanying drawings forming part hereof, and in which:

Figure 1, is a view in side elevation, partly sectioned, illustrating a power plant of the planetary transmission type equipped with clutch bands and casing parts embodying features of the invention.

Fig. 2, is a top or plan view of the lower casing part shown in Fig. 1.

Figs. 3, and 4, are views in end and side elevation respectively of one of the clutch bands shown in Fig. 1, and Figs. 5, and 6, are fragmentary views in end elevation and plan respectively of a modified form of clutch band construction.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

While the features embodying the present invention are applicable to various uses they are admirably adapted for use in connection with Ford cars, and for illustrative purposes a power plant as used in such cars is shown in the drawings and for like purposes the following description will be restricted thereto.

To adjust, repair or reline the reverse band, slow-speed band and brake band of a conventional Ford car construction requires considerable time and skill, is expensive, is a more or less disagreeable performance and frequently results in breaking of delicate parts in dismantling or in assembling. In the event that a Ford car is equipped with a self starter, it is necessary to even remove a portion of the starter mechanism in effecting the removal of a clutch band. While several appliances have been designed to overcome the above recited disadvantages, notably the devices disclosed in U. S. Patents #1,351,680 and #1,366,677, such appliances are not satisfactory from a manufacturer's viewpoint for the reason that special forms of transmission covers are required, necessitating special and expensive patterns, jigs, fixtures and the like. According to the present invention, the conventional form of Ford transmission cover remains the same and the transmission pan has formed therein one or more openings. As the transmission pans are usually of pressed steel, a spray may be made in the die employed and such opening or openings made at the time of stamping out the transmission pans. Obviously the opening or openings may be made by a separate operation if desired. The conventional form of Ford clutch bands are employed with this exception that the bands instead of being an integral formation are made in at least two sections which sections are secured together in a detachable manner. Access to the detachable parts of said sections is had through the opening or openings just referred to. When such parts are detached a clutch band may be lifted in sections through the conventional opening in the transmission cover. Referring now to the drawings in detail 10 designates a transmission pan and 11 a transmission cover. These parts are commonly termed the transmission case and house a planetary transmission including a reverse plate, a slow speed plate, and a brake plate which are encircled by clutch bands. Since all of said clutch bands are of similar construction, a description will now be given of one of them. The conventional Ford clutch band which is an integral structure and made of flexible metal is first severed to form at least two sections 12—13. Thus instead of a substantially circular structure, semicircular sections are provided. The severed ends of said sections are then detachably secured together in any appropriate manner, of which numerous forms may be practised. A simple form of connection is shown in Figs. 3 and 4. To each severed end of sections 12—13 is riveted or otherwise secured an angular bracket 14 apertured for the passage therethrough of a bolt 15, a nut 16 being employed for clamping the sections together. An alternative instance is shown in Figs. 5, and 6, in which the ends of said sections have secured thereto brackets 17 provided with hinge joints 18 secured together by a removable pintle 19. That part of transmission pan 10 immediately adjacent the severed ends of a clutch band is provided with one or more openings 20 of any desired shape and size. In a conventional Ford transmission pan a rib 21 is present upon the underside thereof so that two openings are desirable. Since such transmission pan is usually stamped from pressed steel, a spray may be made in the die employed and such openings made at the time of manufacture of said pans although obviously such openings may be subsequently formed. The openings are closed by plates 22 secured by bolts and nuts. 23 designates a conventional plate provided for transmission cover 11 for closing the open top thereof.

According to the above described construction of parts when it becomes necessary, for any reason, to remove a clutch band, plate 23 and plates 22 are first disengaged from the transmission cover and pan respectively. The upper ends of a clutch band are then disengaged from its complemental pedal (not shown in the drawings) as usual. The severed ends of a clutch band are now unclamped. This may be conveniently and readily accomplished through openings 20 in the transmission pan. The operator in charge may now readily lift sections 12—13 upwardly through the conventional opening in the top of the transmission cover. Obviously replacement of a clutch band may be just as readily accomplished.

Obviously the lining as applied to said sections 12—13 is also sectional and is designated 24—25.

Among the advantages of the above described arrangement of parts mention may be made of the following:—

Present models of power plant transmissions may be manufactured to include the present arrangement of parts without prohibitive expense in change of manufacturing equipment such as dies, patterns, jigs and the like. An unskilled operator, in a short period of time, may readily remove and reinstall clutch bands, without danger of breakage of delicate parts.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. In combination a power transmission of the planetary type including clutch bands each of said bands being of sectional formation, means for removably clamping together the sections of each band, a casing surrounding said transmission which casing is provided with a covered opening immediately adjacent the clamped portion of said sections and being further provided with a covered opening substantially opposite the first mentioned opening.

2. In combination a transmission case including a pan and a cover said cover being provided with an opening in its top, a power transmission of the planetary type including clutch bands housed by said case each of said bands being of sectional formation, means for removably clamping together the sections of each band the transmission pan being provided with an opening immediately below the clamped portions of said clutch sections and means for closing each of said openings.

In witness whereof, I have hereunto set my hand this 14th day of March, 1921.

WILLIAM F. HUDSON.